(12) United States Patent
Bertoni

(10) Patent No.: US 7,467,831 B2
(45) Date of Patent: Dec. 23, 2008

(54) TRACK-TIGHTENING DEVICE FOR CRAWLERS

(75) Inventor: Giovanni Bertoni, Ferrara (IT)

(73) Assignee: Berco S.p.A, Ferrara (IT)

( * ) Notice: Subject to any disclaimer, the term of this patent is extended or adjusted under 35 U.S.C. 154(b) by 48 days.

(21) Appl. No.: 10/519,736

(22) PCT Filed: Jul. 16, 2003

(86) PCT No.: PCT/EP03/07752

§ 371 (c)(1),
(2), (4) Date: Dec. 28, 2004

(87) PCT Pub. No.: WO2004/009430

PCT Pub. Date: Jan. 29, 2004

(65) Prior Publication Data

US 2005/0231035 A1     Oct. 20, 2005

(30) Foreign Application Priority Data

Jul. 19, 2002   (IT)  ........................... MI2002A1599

(51) Int. Cl.
   *B62D 55/14*   (2006.01)
   *F16F 5/00*    (2006.01)
(52) U.S. Cl. ...................................... 305/147; 305/125

(58) Field of Classification Search ......... 305/124–125, 305/135–136, 143, 145–147, 130–134; 280/28.5; 180/9.58, 9.62; 105/215.2
See application file for complete search history.

(56) References Cited

U.S. PATENT DOCUMENTS

| | | | | |
|---|---|---|---|---|
| 2,818,311 | A | * | 12/1957 | Ashley, Jr. ................... 305/147 |
| 3,774,708 | A | * | 11/1973 | Purcell et al. ................ 180/9.5 |
| 3,826,325 | A | | 7/1974 | Purcell et al. |
| 3,938,851 | A | * | 2/1976 | Shelby et al. ................ 305/147 |
| 4,087,135 | A | | 5/1978 | Unruh |
| 4,887,872 | A | * | 12/1989 | Adams et al. ................ 305/147 |
| 5,005,920 | A | * | 4/1991 | Kinsinger ................... 305/146 |
| 5,316,381 | A | | 5/1994 | Isaacson |

FOREIGN PATENT DOCUMENTS

| | | |
|---|---|---|
| EP | 0 800 983 A | 10/1997 |
| EP | 1 199 247 A | 4/2004 |

OTHER PUBLICATIONS

EPO Search Report.
* cited by examiner

*Primary Examiner*—Jason R Bellinger
(74) *Attorney, Agent, or Firm*—James V. Costigan; Hedman & Costigan, P.C.

(57) ABSTRACT

Track-tightening device for crawlers wherein the bogie comprises a track-tightening structure to modify the wheel base of the front and back wheels of the bogie equipped with one or more movable supporting rollers capable of always remaining at the same distance from the idler wheel of the track-tightener under all operating conditions.

8 Claims, 3 Drawing Sheets

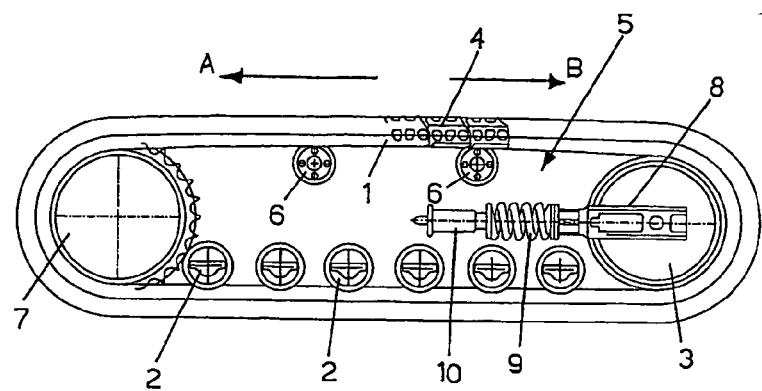
PRIOR ART
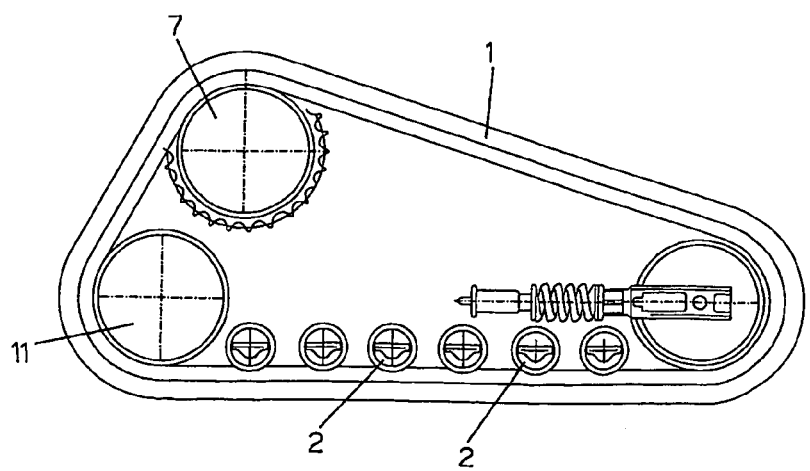
PRIOR ART

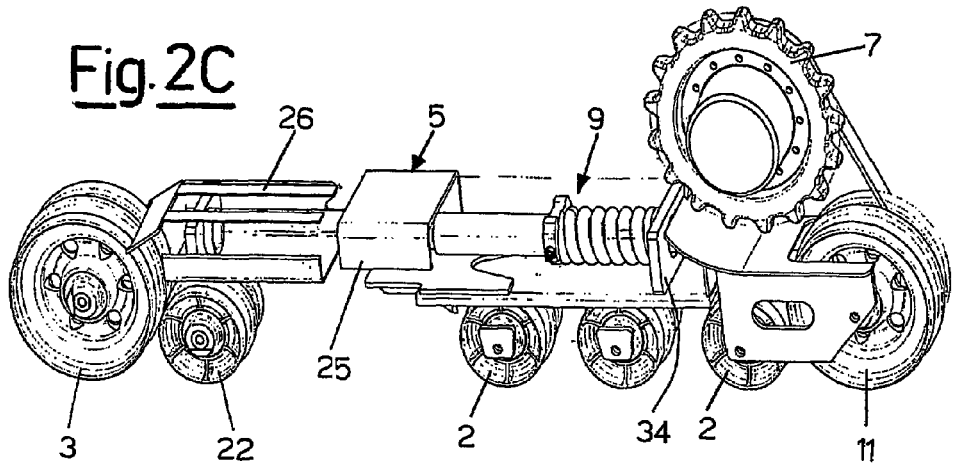
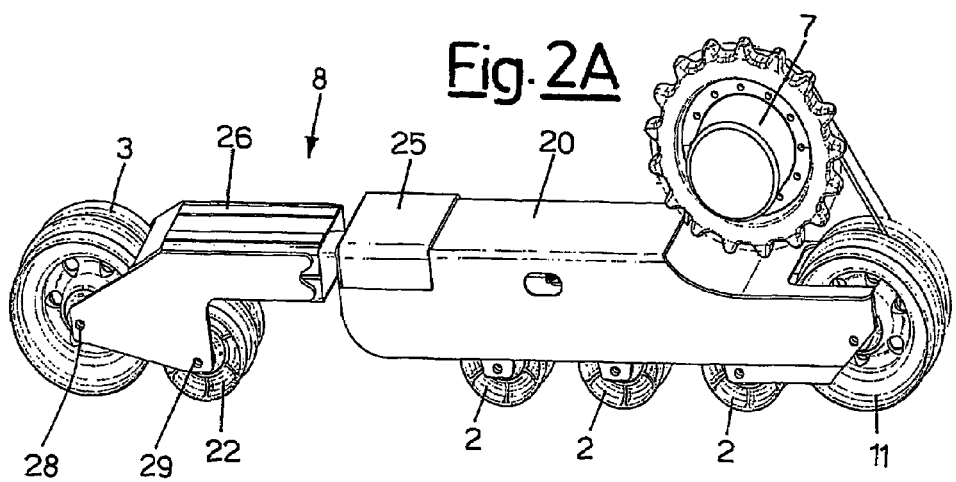
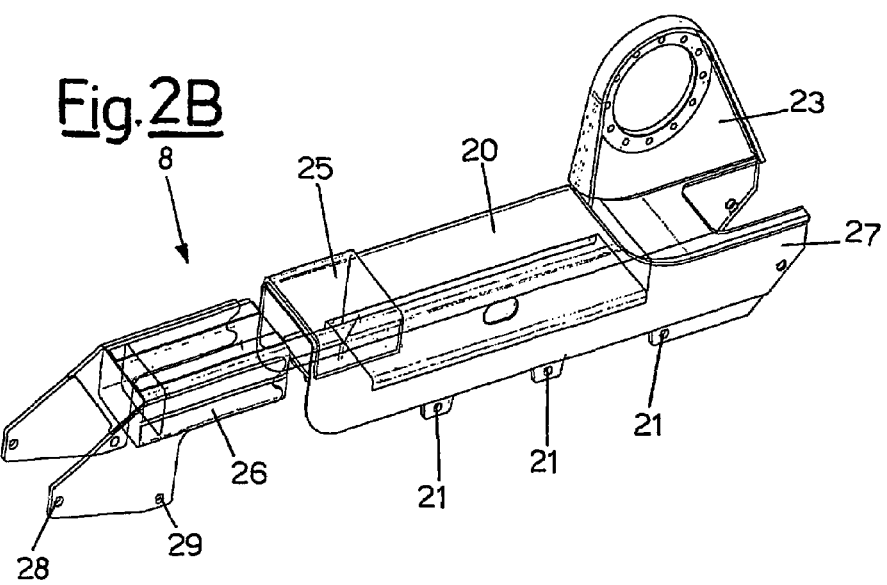

TRACK-TIGHTENING DEVICE FOR CRAWLERS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Apnlicable

REFERENCE TO A MICROFICHE APPENDIX

Not Applicable

In the construction of crawlers, regardless of their type and dimensions, such as farm tractors, bulldozers, loaders, diggers, dumpers, road finishers, it is generally essential to have a track-tightening device. This device has the function of enabling, setting and subsequently maintaining a constant appropriate tension value on the track, in addition to absorbing and limiting accidental tension overloads which can occur when the vehicle is running.

BACKGROUND OF THE INVENTION

1) Field of the Invention

In the various application cases contemplated, the track can have varying structures and be made of different materials, both metallic and non-metallic. In each case, the necessary pre-tensioning values can vary considerably. These depend on the weight and speed of the vehicle, its nature, the type of track installed, the environmental conditions in which the vehicle operates, on each occasion, and also other factors.

Analogously, the tension value limits allowable on the track also differ considerably and essentially depend on the maximum deflecting torque available, clearly linked to the weight of the vehicle, and also to its project dynamic capacities, such as the maximum values required relating to gradability, tensile stress or thrust allowance, in relation to the operating conditions and means of the vehicle.

The track-tightening device not only has the function of maintaining and regulating the tension established in the track while the machine is running. Crawlers are mainly destined to operate in so-called off-road environments, such as quarries, large civil work sites, landslide removals, open mines and so on. In this kind of use, it very frequently happens that a foreign body of any nature can enter the track unit. This is practically a fixed wheel base unit: as the track is an element with a fixed length allowance, i.e. not elastically extendable, the intrusion of a foreign body would require the lengthening of the track to also include the additional hindrance created. The intrusion thus suddenly induces a tension overload on the track and a parallel increase in stress on all the other mechanical units associated therewith, often exceeding the project limits, causing serious damage.

2) Description of Related Art

In practice, in order to overcome this problem, as the tracks are not elastically extendable, the track-tightening device also has the function of absorbing the tension due to the intrusion, by making it possible to shorten the wheel base i.e. by allowing an elastic-type back-pulling of the back-pull idler wheel. In this way a temporary excess is provided, to the necessary extent, of the length allowance of the track with respect to the temporarily reduced value of the crawler idler wheel base.

This not only allows the supplementary instantaneous hindrance of the foreign body inside the track unit to be tolerated and reduced but also limits the overtension induced.

In this temporary phase, by allowing an elastic reduction of the wheel base of the idler and crawler wheels which is sufficient to enable the track to be wound around the crawler wheel without any gripping on the part of its gear teeth, the transmission of the tensile stress from the crawler wheel to the track is eliminated, thus limiting the tension present to only that due to the thrust developed by the track-tightener in this phase.

This additional function attributed to the track-tightener means that it is also capable of having a temporary additional run swing for also tolerating and compensating the intrusion in the track unit of foreign bodies having significant and pre-determined dimensions.

In order to illustrate the technical problems faced and the advantages of the track-tightening device according to the present invention, FIG. 1 schematically indicates the overall undercarriage structure of a crawler, equipped for normal operating directions A and B.

The scheme of FIG. 1 illustrates the essential components of the "undercarriage" which consist of a jointed chain 1 which circulates between the crawler wheel 7 and the front wheel 3, with two substantially straight sections, a lower section defined by the lower wheels 2, on which the weight of the crawler is concentrated, and an upper section defined by the upper wheels 6, respectively.

In more frequent cases, the wheels 2 are individually fixed to the bogie; it often occurs however that the wheels 2 are assembled in pairs on rigid supporting elements, in turn fixed to the bogie. These elements can be of the equalizer type, capable of a limited angular rotation around a transversal axis to follow, with a clockwise and anticlockwise rotation, the unevenness of the ground, thus improving the adherence of the machine for a better contact between the track and the ground. These equalizers can also be equipped with a run end and elastic shock absorbers.

This form of embodiment, with rollers capable of oscillating, tends to cause a more complete faying surface of the track/ground contact point, on which the vehicle must move, with an improved traction/thrust capacity of the crawler. This type of arrangement of the supporting rollers 2 is normally defined as "floating bogie".

A truck suspension assembly of this kind is known from U.S. Pat No. 3,826,325.

In U.S. Pat No. 3,826,325 the track frame of a vehicle is pivotally mounted to the vehicle main frame and has crank members pivotally mounted to the opposite ends of the track frame. Each crank member has mounted thereon an idler and a bogey to which is fixed a pair of track rollers. These idlers and track rollers are engaged by a continuous track chain, and the track frame is supported at the crank member-track frame pivot points by means of the idlers and track rollers. Stop members and resilient pad means are associated with the crank members, link members, and track frame for proper support of the track frame.

A series of soles or skids 4 is applied to the chain 1, which can be of various kinds and which must ensure both adherence to the ground to transmit the tensile strength and also the distribution and sustenance of the weight of the crawler on the ground. The shock absorber-tightening group 5 is connected to the axis of the front wheel 3, opposite the crawler wheel.

This general scheme shows a traditional track-tightening device in which the idler wheel 3 is assembled on supports 8 which allow it to move in a longitudinal direction with respect to the undercarriage structure, the elastic shock absorber 9 is indicated as a propeller spring which operates under compression and a tightener as a grease cylinder 10. For the tightening and shock absorbing function, spring, oleodynamic, pneumatic devices have been proposed and also grease, floating piston devices integrated with each other by means of various structure either separate or integrated with each other each time, with solutions which satisfy all the individual performance requirements of the track-tightener, and also the necessity of limiting the hindrances of the overall system, facilitating assembly and maintenance.

In some cases, the scheme of FIG. 1 is modified according to the scheme of FIG. 1A, in which the back wheel 11 is a simple back-pull and the crawler wheel 7 is assembled in a backward but higher position, giving the perimeter of the chain 1 a triangular allowance.

In most crawlers, the structural supporting element of the weight of the machine to be distributed on the ground consists of an intermediate structure, generally called "bogie" or "undercarriage", consisting of a kind of beam, present in a pair, at least one for each side of the vehicle, with a high rigidity and low deformability. In the most recent constructions, these structures are generally produced with boxes of a metallic carpentry, having a composite and/or lattice structure, on which the rolling elements necessary for moving and supporting the vehicle are assembled (in the scheme of FIG. 1 for example the supporting rollers 2 situated in the lower section of the chain 1), whereas the upper part of the "bogie" forms the rest base which supports all the remaining structure of the machine and its main elements, such as engines, drive, pumps and so forth.

If the crawler rests and runs on a substantially flat surface, there is no contribution nor requirement on the part of the idler wheel 3 for supporting the vehicle.

As a whole, the upper positioning of the idler wheel 3, with respect to the bearing line consisting of the tangent line connecting the supporting rollers 2 with the actual track itself (chain 1 and skids or soles 4) in the crawler, is defined so that the analogous contact point from the lower part of the idler wheel with the track is substantially higher than said tangent line. This arrangement is essential for the running regularity of the vehicle, allows a progressive grip with the ground on the part of the skid and also reduces the high resistance encountered by the track units when changing direction.

The situation on uneven land is, on the other hand, completely different: in the presence of a frontal obstacle or even only at the beginning of a steep slope it is the first part of the track carried by the front idler wheel 3 which supports the weight of the front part of the vehicle, whereas the supporting rollers 2 are suspended and cannot be used for supporting the vehicle. The element of the front idler wheel 3 has to carry part of the weight of the vehicle also in the presence of yielding or uneven ground.

Between the supporting rollers 2, normally all of the same size, and the idler wheel 3, there is generally a considerable difference in diameter and hindrance. This does not allow equalness in the minimum distance possible between the respective contact points of said elements with the chain 1 of the track: the elements with a smaller diameter can be distributed quite close to each other and create a series of contact points near to the track. On the contrary, the first supporting roller 2 of the line cannot be situated very close to the idler wheel 3, for the geometrical and mechanical reasons already explained. One of these is the diameter of the idler wheel itself 3, which is generally much greater than that of the supporting rollers 2 and which cannot be reduced to below a certain minimum value, in relation, in turn, to the pitch of the chain and maximum articulation angle possible between the rods or adjacent section of the chain itself.

The section of track between the axis of the idler wheel 3 and the axis of the first of the supporting rollers 2 is therefore the relatively longest part of track without contact points with the rolling elements. These parts are consequently more exposed to significant negative flexure deformation which considerably jeopardizes the integrity of the track system, also as a result of the deformations caused by the localized bumps and obstacles inevitably present in the ground, particularly in off-road use.

In this respect, the maximum allowable articulation in a negative sense on a track is normally equal to about ¾ of the corresponding value in a positive sense, i.e. of the articulation angle between two adjacent sections of the track when it is wound around the wheels 3 and 7. In general, a value of 8-10° is practically allowable as a maximum negative flexure angle, whereas the limit allowed as a positive flexure angle rises to 35-38°. In other words, the external periphery of the track should not have a significant concavity. In this case, exceeding the allowable negative flexure values causes mechanical interference phenomena among the adjacent elements forming the track (skids or soles 4) with the possibility of damage or breakage, considerable over-tensioning on the joints of the chain, and a slackening or loss of the skid fixing units, generally jeopardizing the integrity of the track. This situation is particularly serious in the case of chains of the lubricated type, which are of a high quality and costly but also extremely sensitive to ill-treatment.

Even if the external concavity of the track, or its negative flexure, remains within the allowable limits mentioned above, it is still a determining factor of the progressive internal wear of the track joints and reduction in its technical life. It is consequently essential that the negative flexure be limited and hindered as much as possible.

A reduction in the entity of this phenomenon has a considerable economical value, as a life prolonging factor of the track and consequently of the other parts forming the overall track unit and operating in contact therewith.

When determining the operating cost of crawlers, the amount relating to maintenance and depreciation of the tracks is generally one of the main items of its hourly cost, having the same importance as the other direct costs such as fuel consumption and labour cost. Prolonging the life of the track unit, with a consequent reduction in its cost incidence, is therefore determinant for competitiveness in the use of the vehicle. It should also be considered that the track unit must be completely replaced for reasons of wear after several thousands of operating hours, varying according to the type of machine.

Another function assigned to the track-tightening device is linked to the installation and subsequent tightening of the track on the machine. Considering the track is generally inextensible and must be fixed, to also resist transversal stress, to other elements of the track unit which prevent its uncoupling and side detachment when operating, its assembly without the track-tightening device would be practically impossible or in any case extremely difficult.

It should finally be taken into account that the regulation of the wheel base between the wheels is essential, during the life of the track, in order to "restore", or recover, its extension with time, due to the progressive wear of its joints.

In operating practice, the track-tightener tends to compensate said extension by means of successive increases in the wheel base, until a total increase equal to ½ pitch of the track. At this point, one of the sections of the track is removed, thus bringing it to the original length allowance value, and parallelly the wheel base is brought back to its initial value.

In general practice, the various functions required of the track-tightener can be satisfactorily effected, as mentioned, by the combined action of an elastic-type element (for example a cylindrical propeller spring), with a device having a registerable run end function. It can consist for example in a cylinder/piston group containing grease under pressure, or with an oleodynamic drive. In simpler cases, it can be produced with a maneuvering screw device, with blockage by means of a nut and locknut; in more sophisticated applications, combined devices of the oleo-pneumatic type, have also been proposed, which are capable of effecting both shock absorbing and track-tightening functions.

Regardless of their constructive complexity, all these track-tightening systems require an instantaneous reduction of the elastic type in the wheel base between the wheels 3 and 7, when the tension value of the chain exceeds a set threshold value and in addition, and separately, the possibility of registering (for both increases and reductions) the wheel base between said wheels. The effect required is always a movement, depending on the forward or backward cases, of the back-pull wheel 3, which is typically an idler wheel.

From what is specified above, it is evident that with these movements of the back-pull wheel, the distance between the axis of the idler wheel 3 and the axis of the first supporting roller 2 of the bogie is also varied, which, according to the known art, causes considerable damage and drawbacks.

BRIEF SUMMARY OF THE INVENTION

An objective of the present invention is to provide a track-tightening device which, by avoiding the disadvantages of the track-tightening systems available in the known art, is capable of overcoming the onerous functions attributed thereto. In particular, it is directed towards keeping the length of the section of track situated between the axis of the idler wheel 3 and the axis of the first wheel 2 adjacent thereto, which has no support, constant and at a minimum value during the functioning of the crawler under all conditions.

This objective according to the present invention is achieved with a track-tightening device for crawlers, comprising an undercarriage or bogie consisting of a structure (20) which includes elements (21) for carrying lower supporting rollers (2) as well as idler back-pull wheels (11) and optionally a crawler wheel. The present invention has a housing guide system (25) for controlled axial sliding of a track-tightening device (5) carried by a second movable structure (8). The second movable structure (8) being equipped with fittings (26) which interconnects with the guide system (25), said second movable structure possesses an idler wheel (3) as well as supporting rollers (22), the structure (20) and the second movable structure interact by way of guide (25) and fittings (26) to modify the wheel base between the idler wheel (3) and the back pull wheel (11) of the bogie by axial sliding. The second movable structure (8) also carries at least one supporting roller (22), capable of following the longitudinal movement of the idler wheel (3), characterized in that at least the first of said supporting rollers (22) is in constant contact with the idler wheel (3) so that the distance does not vary during the operating life of the vehicle, under any operating condition and with any range of the track-tightening device. The present invention can achieve its objectives by variation or modification of the elements disclosed and by the use of additional structural elements. The present invention also discloses a spring to mediate the interaction between the second movable structure (8) and the structure (20). Additionally, the spring possess attendant structures to aid in lubrication and support of the various components and housing typical of this type of structure.

The characteristics and advantages of the track-tightening device according to the present invention appear more evident from the following illustrative but non-limiting description, referring to its embodiment on a typical and industrially significant crawler.

BRIEF DESCRIPTION OF THE SEVERAL VIEWS OF THE DRAWINGS

FIG. 1 illustrates the general scheme of the "undercarriage" structure and represents the state of the art and technical problems involved. FIGS. 2 and 3 show illustrative embodiments of the track-tightening device according to the invention.

FIGS. 2A, B, C illustrate schematic views of a typical embodiment of the invention, referring to the architecture of the "undercarriage", or bogie, illustrated in FIG. 1A, with the crawler wheel 7 situated in a higher position. In particular, FIG. 2A shows the whole "undercarriage" according to the invention, without the conventional parts of the track; FIG. 2B shows its box-like structure; FIG. 2C shows the arrangement of the track-tightening device inside the box structure. FIG. 3 shows an example of the shock absorbing and tightening device of the track.

In FIGS. 2A, B, C, the undercarriage consists of a lattice or box structure 20 which comprises the elements 21 for the insertion of the axes of the lower supporting rollers 2, the rear structure 27 for the back idler wheel 11 and the frame 23 for the crawler wheel 7. For the sake of simplicity, the structure 20 is shown with only three supporting rollers 2. A guiding system 25 is housed in the front end of the box structure 20 and attached thereto, which allows the controlled axial sliding of the structure 8 supporting the track-tightening device 5. In coherence with the geometry of the guides 25, the movable structure 8, carrying the track-tightener and the front idler wheel 3, is produced as a box structure with fittings 26 for being coupled with the guides 25 and sliding longitudinally inside the box structure 20 of the bogie, in a protected position. The movable section of the track-tightening device connected to the structure 8 is thus fitted into the front of the bogie of the machine. In the illustrative figures enclosed, the track-tightening device is shown installed on the box structure 20 to be moved according to a horizontal axis, but it can also be installed for moving with a certain inclination with respect to the horizontal.

Figure 3:
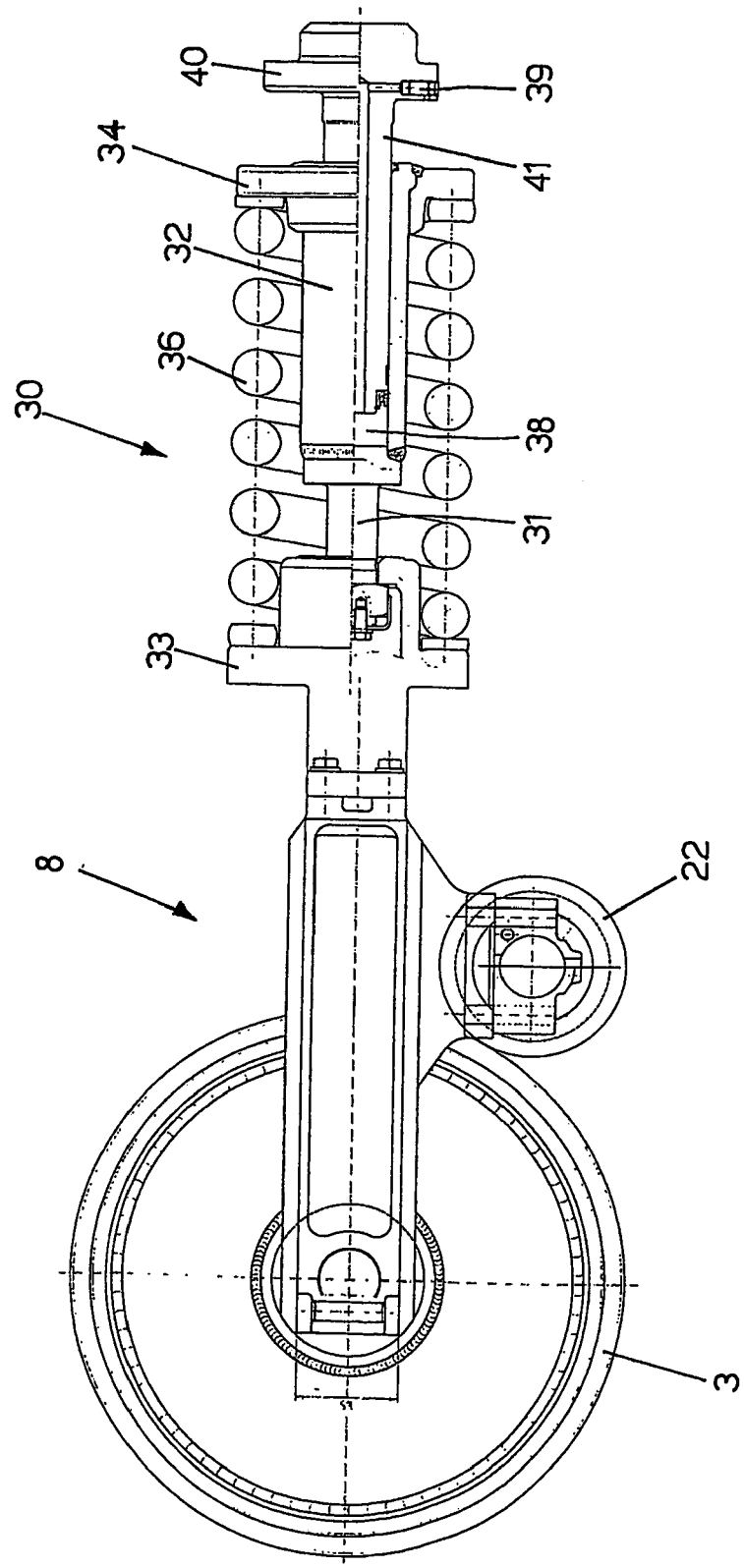

The form of the holding supports and guides 25/26 of the track-tightening device according to the invention can vary in relation to the type of machine to which it is applied. They can be in a very simple form, for example prismatic, normally presented in the simplest types, or in a complex form for machines which operate in movement, and not at a standstill, wherein said supports can be obtained from fusions of a suitable form subsequently subjected to mechanical processing.

According to an important characteristic of the present invention, the moving structure 8 also comprises—in addition to the elements 28 for the installation of the idler wheel 3—elements 29 for providing the sliding part of the track-tightener with at least one supporting roller 22, which is consequently capable of following the longitudinal movement of the front idler wheel 3, always remaining at the same distance therefrom, under any operating condition and with any range of the track-tightening device. In the embodiment illustrated in FIGS. 2A, B, C, the moving structure 8 is shown with only one supporting roller 22, but several rollers 22 can also be assembled. The moving supporting roller(s) 22, can have the same structure and dimensions as the fixed supporting rollers 2, but can also be produced with a different structure and dimensions according to the use of the crawler. Similarly, the upper positioning of the moving supporting rollers 22 with respect to the fixed supporting rollers 2 can be effected to align their lower contact points with the track on the same line, or higher up to gradually lift the track between the fixed supporting rollers 2 and the idler wheel 3.

Components can be inserted between the longitudinal guides 25 fixed to the structure 20 of the "undercarriage" and the fittings 26 situated on the moving structure of the track-tightener, to facilitate the reciprocal longitudinal sliding, such as ball bearings, strips of antifriction material, lubricated guides and so on.

The driving element unit of the track-tightening device is installed inside the structure 20, at whose end there is an adjustable fitting 34 for the assembly of its movable part having the function of tightener and shock absorber. FIG. 3 illustrates the structure of a tightening and shock absorbing device 30 which can be inserted into the box of the structure 20 of the "undercarriage" to create the longitudinal range of the structure 8 which supports the idler wheel 3 and the supporting roller 22, guided by the elements 25/26 of FIGS. 2A and 2C, not shown herein for the sake of simplicity.

The tightening/shock absorbing group 30 comprises a cylindrical telescopic guide consisting of a piston 41 which moves inside a hollow cylinder 32, in a longitudinal direction. A shoulder 34, at the exit end of the piston 41, and a stem 31, positioned in the axis with the cylinder 32, at its head, at the opposite end to the exit end of the piston 41, are firmly and immovably fixed to the cylinder 32. A movable shoulder 33 is situated on the stem 31, which slides along the stem 31 and is prevented from exiting therefrom by means of a specific mechanical stop situated at the end of the stem 31. The shoulder 33 is fixed to, or alternatively only rests on, the structure 8 containing the idler wheel 3.

A helicoidal spring 36 is compressed between the two shoulders 33 and 34, with a free length greater than the maximum distance between the two shoulders and coaxial with the telescopic guide 41/32, and which operates by continuously forcing the sliding shoulder 33 against the mechanical stop situated at the front end of the stem 31, which operates as a tie rod, in relation to the compression created by the spring 36 at the moment of its assembly. At the bottom of the cavity of the cylinder 32, there is a chamber 38 which acts as an adjustable run end and tightener for the track 1.

In the situation described, the thrust value developed by the spring 36, depending on the fact that the distance in an axial sense between the shoulders 33 and 34 is less than its free length—normally known as the "preload" value of the track-tightening group—represents the elastic indeformability limit of the device, when subjected to axial compression stress. As long as the axial compression applied to the group does not exceed the preload value of the spring 36, the device behaves as axially indeformable. When, on the other hand, it exceeds the preload value, the deformation of the spring 36 causes the shoulder 33 to slide along the stem 31 towards the shoulder 34, with a proportional increase in the load of the spring 36.

The sliding stops in the position in which the two forces are balanced. In this configuration, with the shoulder 33 in a backward position with respect to its rest position, the front portion of the stem 31 freely penetrates a space inside the structure 8. As already specified, at the bottom of the cavity of the cylinder 32, there is a chamber 38 which acts as an adjustable run end and tightener of the chain 1. This chamber is filled with an injection of grease or other lubricant through the duct 39 until the calibration of the longitudinal position of the shoulder 34 is reached with respect to the shoulder 40, firmly connected, in turn, to the structure 20 of the undercarriage.

Once the end 40 of the piston 41 has been made integral with the box structure 20, with the injection of grease into the chamber 38, the extension of the telescopic system 41/32 is obtained, with a homogeneous translation towards the left of the two shoulders 33/34, the spring 36 between them, the cylinder 32 with the stem 31, and consequently also the structure 8 supporting the idler wheel 3, pushed by the shoulder 33.

This extension towards the left occurs freely until the idler wheel 3 comes into contact with the track 1, resting against it and tightening it. Under this condition, any further movement towards the left of the wheel 3 is prevented by the reaction of the track 1—substantially inextensible—and the whole system is prevented from undergoing further extensions. The reaction developed by the track against the idler wheel 3 is equal to double the value of the tension induced on the track itself and forms the axial compression stress applied to the track-tightening system, which, in turn, transfers it to the rest situated on the structure 20 to sustain the end 40 of the piston 41.

The track-tightening device is therefore included and compressed between said rest and the track 1, wound on the idler wheel 3 according to a winding angle of between 90° and 180°. By selecting the pressure value in the chamber 38 with the injection of grease into the chamber 38, a tension value is applied to the track 1 with the desired calibration—normally slightly lower than the "preload" value—which can be easily registered according to the conditions of use.

In the case of the accidental over-tensioning of the track 1, due to the entrance of foreign bodies inside the track unit of the machine while operating, the structure 8 is elastically reversed with a temporary increase in the load on the spring 36 due to the withdrawing of the shoulder 33. The system automatically returns to the initial configuration under the thrust of the spring 36, once the cause of the over-tensioning of the track has been removed.

The removal of the grease from the chamber 38 allows a reduction in the overall length of the system to the value sufficient for the installation and removal of the track. The progressive injection of grease allows the clearances and consumptions which cause the progressive lengthening of the track, to be recovered. It is therefore evident how the device according to the invention illustrated in FIG. 3 is capable not only of performing the functions generally requested of track-tightening devices, but also that of limiting and maintaining a constant distance between the idler wheel 3 and the first supporting rest rollers.

The structure of the device of FIG. 3 can also be produced by separately placing the spring 36 and grease tightening cylinder, in series on the same axis or on parallel axes.

DETAILED DESCRIPTION OF THE INVENTION

The device according to the invention allows the functions required by the track-tightener of a crawler, as described above, to be satisfied.

This device abandons the traditional architecture of the undercarriage of crawlers where all the supporting and rest units on the ground, i.e. the supporting rollers 2, are installed in a fixed and non-modifiable position on the bogie, and where only the idler wheel 3, normally in a front position, can effect controlled movements, in an axial direction with respect to the bogie, forwards or backwards. According to the invention, at least the first supporting roller 22 is not installed on the bogie, but belongs to the movable part of the track-tightening device and is integral with the idler wheel 3, at a minimum and pre-selected distance therefrom. In this way, the first supporting roller(s) 22, follow the idler wheel 3, at a constant distance, in all the movements effected while the vehicle is operating, however they are caused.

The device according to the invention guarantees a sufficient rapid elastic response, in proportion to the demands imposed by the crawler dynamics. The result and functions pursued, are obtained simply and economically by resorting to a track-tightening device having the characteristic of the internal incorporation of at least the first of the supporting rollers 22, integral with the idler wheel 3, so that the reciprocal distance does not vary during the operating life of the vehicle.

The supporting roller(s) 22 made integral with the movable part of the track-tightening device can, as already specified, be single and firmly fixed individually to the bogie, or installed in pairs, close to each other, on specific rigid supporting elements, which in turn are then installed on the bogie, with the "floating bogie" arrangement described above.

The present invention can therefore also be embodied by making the idler wheel 3 and the first of the "floating bogies" integral with each other, as said floating bogie forms the first of the "supporting elements" included in the track unit.

In the device according to the invention, the idler wheel 3 can also be used as an auxiliary supporting element with respect to the weight of the machine in the case of uneven ground, with localized obstacles or brusque variations in the gradient.

Also in this condition, the advantage is evident, of inserting, at the minimum distance from the idler wheel 3 and maintaining said distance constant, a supporting element such as the first supporting roller 22 or the first floating bogie, thus putting the track unit in the best possible operating conditions: both the idler wheel 3 which finds the immediate support of the supporting roller 22, and also the track which has a minimum length of non-supported section and which does not create a significant concavity externally under conditions of major stress.

In terms of performances, the advantages deriving from the present invention are linked to the improved operating condition of the track and its greater duration. This leads to an improvement in the operating factor of the whole machine, as problems relating to the track unit are among the most frequent cause of breakdowns.

As already mentioned, the items relating to the operating cost of crawlers with respect to the track unit are high and more or less correspond to fuel consumption and labour costs. The prolonging of the useful life of the track directly influences the competitiveness of the whole crawler.

The invention claimed is:

1. A track-tightening device for crawlers, comprising an undercarriage or bogie consisting of a structure (20) which includes elements (21) for carrying a plurality of fixed lower supporting rollers (2), as well as idler back-pull wheels (11) and optionally a crawler wheel, said structure (20) also housing a guide system (25) for controlled axial sliding of the track-tightening device (5) carried by a second movable structure (8), said second movable structure (8) being equipped with fittings (26) which interconnect with the guide system (25), said second movable structure (8) having an idler wheel (3) as well as at least one movable supporting roller (22) capable of following the longitudinal movement of the idler wheel (3), the structure (20) and the second movable structure interact by way of a guide (25) and fittings (26) to modify the wheel base between the idler wheel (3) and the back pull wheel (11) of the bogie by axial sliding, wherein the structure (20) is box shaped and where at least one of said movable lower supporting rollers (22) is in constant contact with the idler wheel (3) so that their reciprocal distance does not vary during the operating life of the vehicle, under any operating condition and with any range of the track-tightening device, said movable lower supporting roller (22) being attached to said second movable structure (8) so that the length of a section of track situated between the axis of the idler wheel (3) and the axis of said movable lower supporting roller (22), is constant and at a minimum value during the functioning of the crawler under all conditions.

2. The track-tightening device for crawlers according to claim 1, wherein the second movable structure (8) carries two or more movable supporting rollers (22).

3. The track-tightening device for crawlers according to claim 1, wherein the idler wheel (3) is installed on the bogie in a front position.

4. The track-tightening device for crawlers according to claim 1, wherein the movable supporting rollers have the same structure and dimensions as the fixed lower supporting rollers (2).

5. The track-tightening device for crawlers according to claim 1, wherein the track tightening device (5) is activated with a tightener/shock absorber group (30) which comprises a helicoidal spring (36) possessing a fixed shoulder (34), said helicoidal spring operates in extension, and a chamber (38) filled with the injection of a lubricant which acts as an adjustable run end and tightener of the chain (1) of the track.

6. The track-tightening device far crawlers according to claim 5, wherein the tightener/shock absorber group (30) comprises calibration means of the longitudinal position of the fixed shoulder (34) of the helicoidal spring (36) with respect to the structure (20) of the undercarriage.

7. The track-tightening device for crawlers according to claim 5, wherein the tightener/shock absorber group (30) comprises a cylindrical telescopic guide (31/32) coaxial with the helicoidal spring (36) and with the lubricant injection chamber (38).

8. The track-tightening device for crawlers according to claim 5, wherein the tightener/shock absorber group (30) is comprised of the helicoidal spring (36) and with the lubricant injection chamber (38) separate and arranged in series on the same axis.

* * * * *